United States Patent [19]

Ewert

[11] Patent Number: 5,203,447
[45] Date of Patent: Apr. 20, 1993

[54] DRIVE MECHANISM FOR A CONVEYOR

[75] Inventor: Terry S. Ewert, Sussex, Wis.

[73] Assignee: Dorner Mfg. Corp., Hartland, Wis.

[21] Appl. No.: 866,146

[22] Filed: Apr. 9, 1992

[51] Int. Cl.$^5$ .............................................. B65G 39/16
[52] U.S. Cl. .................................... 198/807; 198/814; 198/835
[58] Field of Search ............... 198/806, 807, 813, 814, 198/816, 835

[56] References Cited

U.S. PATENT DOCUMENTS

| | | | |
|---|---|---|---|
| 2,591,089 | 4/1952 | Moon | 198/835 |
| 2,951,580 | 9/1960 | Slomer | 198/814 X |
| 3,212,628 | 10/1965 | Massey et al. | 198/816 |
| 3,540,571 | 11/1970 | Morse et al. | 198/806 |
| 3,937,338 | 2/1976 | Cox | 198/835 X |
| 3,949,864 | 4/1976 | Montsant | 198/835 |
| 4,421,228 | 12/1983 | Marsiglio et al. | 198/814 |
| 4,881,929 | 11/1989 | Randles | 198/813 X |

Primary Examiner—D. Glenn Dayoan
Attorney, Agent, or Firm—Andrus, Sceales, Starke & Sawall

[57] ABSTRACT

An improved drive mechanism for a conveyor. An endless belt is mounted for travel on the frame of the conveyor and is driven by a drive unit. The drive unit includes a supporting structure or housing that carries a power source, such as a motor. The output shaft of the motor is connected by a flexible drive member to a pair of drive spindles that support the conveyor belt. The drive unit also includes a pair of belt tensioning spindles which are journaled for rotation on slides that are mounted for movement on the supporting structure of the drive unit. A drive mechanism, such as a fluid cylinder, is operably connected to the slides to move the slides in unison to tension the belt.

17 Claims, 2 Drawing Sheets

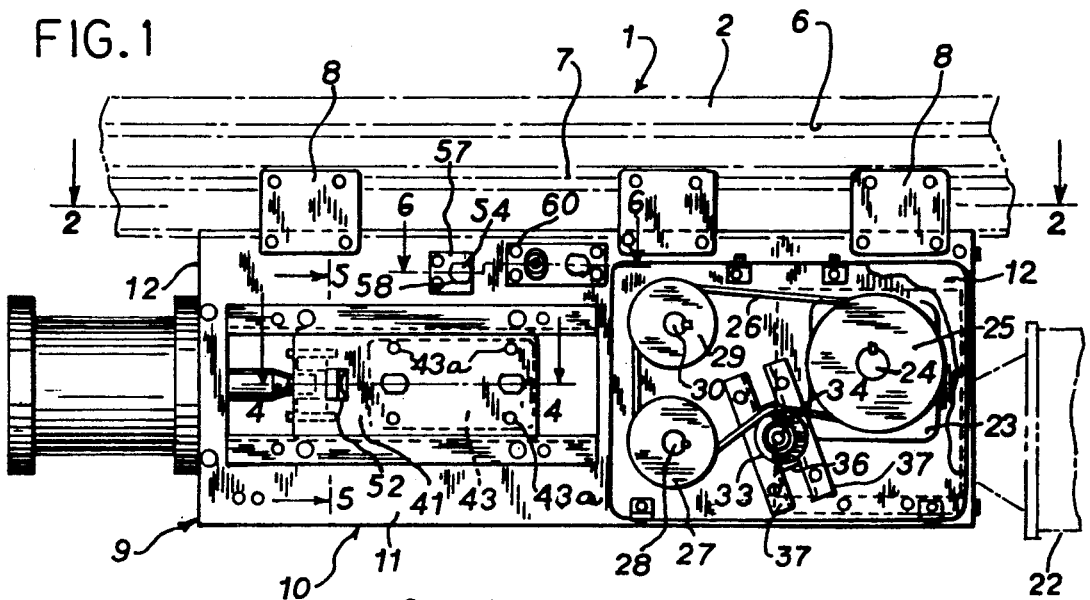
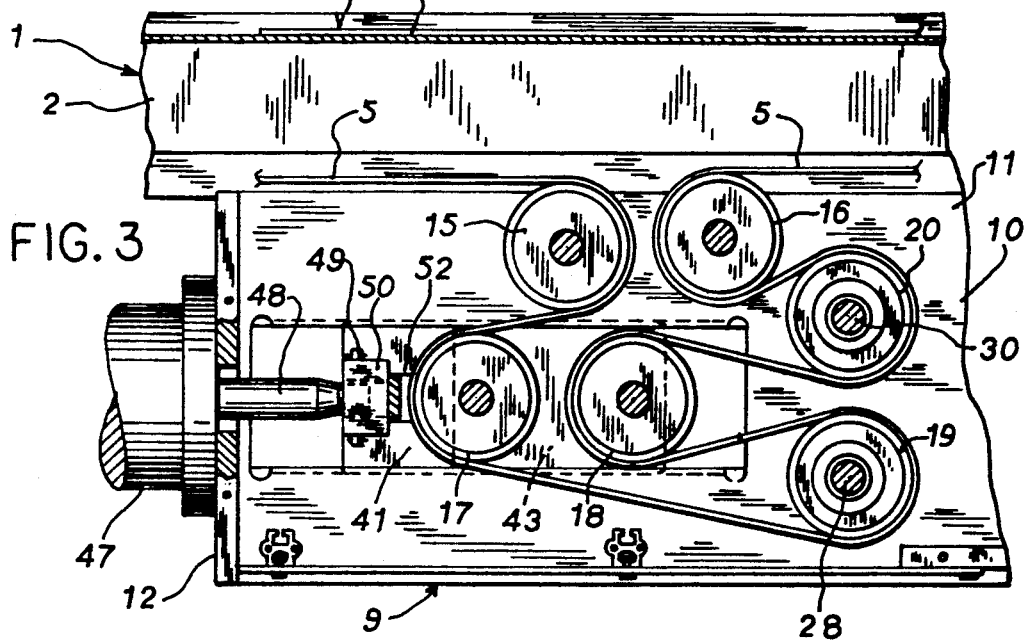
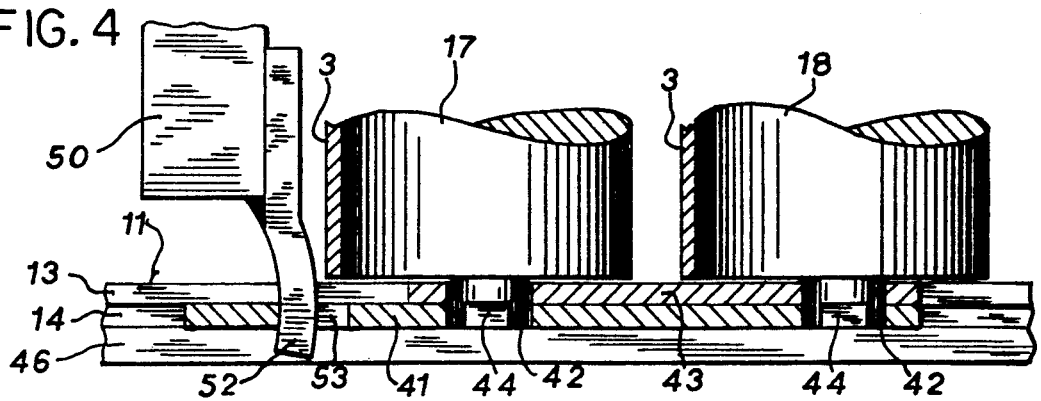

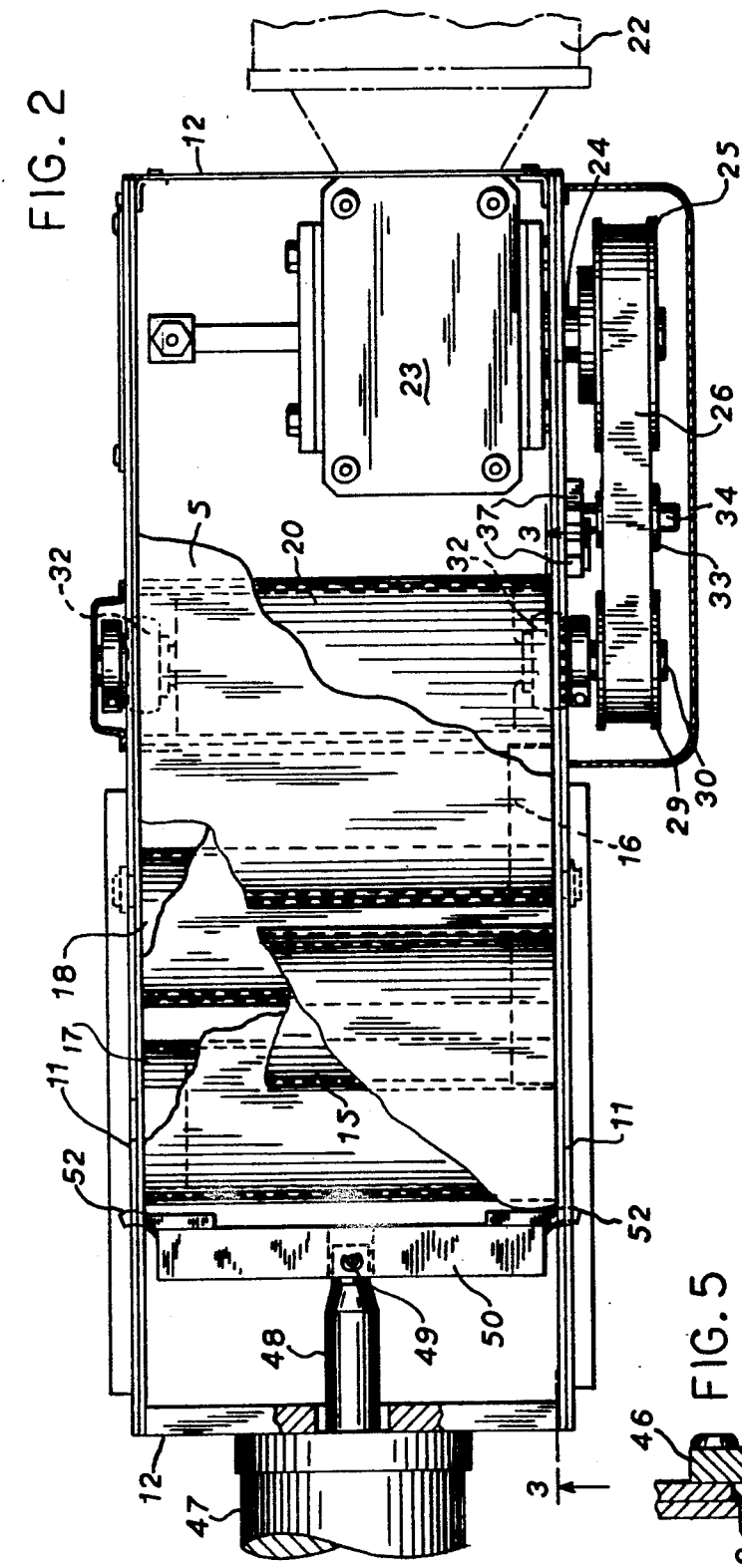
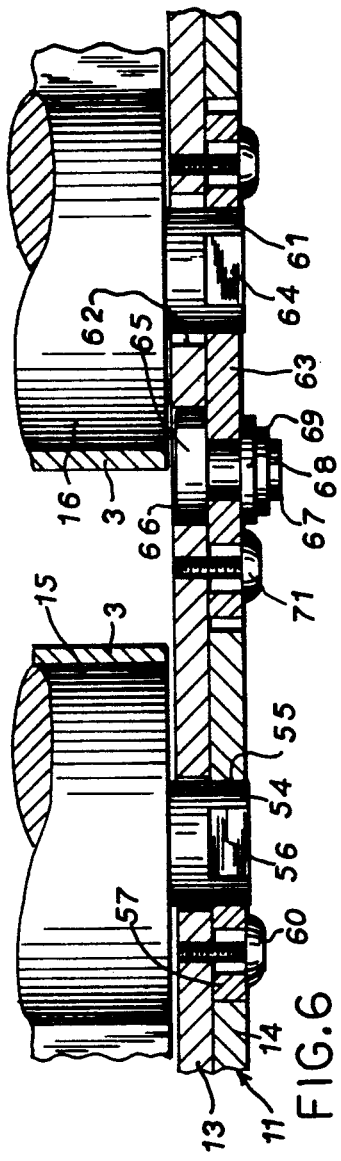
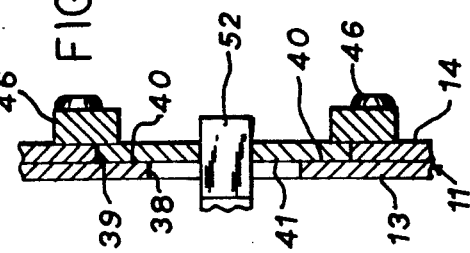

DRIVE MECHANISM FOR A CONVEYOR

BACKGROUND OF THE INVENTION

A typical conveyor for conveying relatively small articles includes a frame having a pair of spaced parallel side rails and a conveyor belt is trained over spindles that are journaled in the side rails and are located at the ends of the conveyor frame. In certain installations, a drive unit, including an electric or hydraulic motor, is mounted on one of the side rails of the frame and is connected through a speed reducing transmission to one of the spindles to drive the belt. In other installations, the drive unit is located beneath the lower run of the conveyor belt and the belt is trained over a drive spindle in the drive unit. The drive spindle is connected via a timing belt or chain drive to the drive shaft of the motor of the drive unit.

The typical conveyor belt requires a belt tensioning mechanism to achieve proper tension on the belt and maintain frictional engagement with the drive spindle. A common form of belt tensioning mechanism is connected to the bearing blocks that journal a spindle at the end of the conveyor and the tensioning mechanism is constructed to move the bearing blocks and spindle outwardly to increase the tension on the belt. With a drive unit that is mounted beneath the lower run of the conveyor, a belt tensioning spindle is frequently incorporated in the drive unit.

Conveyor belts are typically designed with a 1% maximum stretch. This means that if a conveyor is 100 feet long, the belt will be approximately 200 feet long so that the 1% maximum stretch would be approximately 2 feet. Therefore, it is important that the belt tensioning system associated with the conveyor be adequate to accommodate the maximum possible stretch of the belt.

The driving traction to drive the belt is dependent not only on the belt tension but also on the degree of wrap of the belt around the drive spindle or other drive member. Therefore, it is important to design a drive system to obtain maximum wrap in order to achieve the desired driving traction.

SUMMARY OF THE INVENTION

The invention is directed to an improved drive system for a conveyor. In accordance with the invention, the conveyor includes a frame having a pair of spaced parallel side rails, and an endless conveyor belt is supported for travel on the frame. The drive unit of the conveyor is mounted beneath the frame and includes a power source, such as an electric or hydraulic motor, having an output drive shaft. The output drive shaft is connected via a flexible drive member, such as a timing belt or chain, to a pair of drive spindles that support the lower run of the conveyor belt. As the timing belt is engaged with a pair of drive spindles, both of which are in driving engagement with the conveyor belt, the area of surface contact between the driving members and the conveyor belt is substantially increased, thereby substantially increasing the driving force.

As a second feature of the invention, an improved belt tensioning mechanism is incorporated with the drive unit. In this regard, a pair of belt tensioning spindles are each journaled for rotation on a slide plate that is mounted for sliding movement on guide tracks attached to the frame of the drive unit. A reciprocating actuating member, such as a fluid cylinder, is operably connected to the slides to move the tensioning spindles in unison to thereby tension the belt. In this construction, the amount of belt take-up is approximately twice the stroke of the actuating cylinder, thus providing a more compact belt tensioning mechanism.

The drive unit of the invention can also incorporate a belt tracking mechanism to maintain proper alignment of the conveyor belt on the frame and prevent skewing. One form of the belt tracking mechanism can be a pivotable yoke which is interconnected between the fluid actuating cylinder of the belt tensioning mechanism and the slide plates that carry the tensioning spindles. The yoke provides a self-tracking mechanism which will act to maintain proper alignment of the conveyor belt on the frame.

The drive unit can also include a second belt tracking mechanism in which one of the idler spindles in the drive unit can be skewed by individual operation of cams or eccentrics that are operably connected to the ends of the spindle.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of a portion of a conveyor incorporating the drive unit of the invention;

FIG. 2 is a section taken along line 2—2 of FIG. 1;

FIG. 3 is a section taken along line 3—3 of FIG. 2;

FIG. 4 is a section taken along line 4—4 of FIG. 1;

FIG. 5 is a section taken along line 5—5 of FIG. 1; and

FIG. 6 is a section taken along line 6—6 of FIG. 1.

DESCRIPTION OF THE ILLUSTRATED EMBODIMENT

FIG. 1 illustrates a conveyor that includes a frame 1 having a pair of spaced parallel side rails 2. A conveying member, such as an endless belt 3, is mounted for travel on frame 1 in an upper run 4 and a lower run 5.

Side rails 2 of the conveyor frame can be constructed as shown in United States patent application Ser. No. 07/731,526. As described in that patent application, each side rail includes a pair of parallel longitudinal slots 6 and 7. A series of connecting plates 8 are attached by screws to slide blocks, not shown, that are mounted in the lower slot 7 of each side rail, and the lower ends of the connector plates 8 support a drive unit 9.

Drive unit 9 is composed of a generally rectangular housing 10 having a pair of spaced side walls 11 and a pair of end walls 12 which are connected to the respective ends of the side walls. Each side wall 11 consists of an inner wall section 13 and an outer wall section 14 which is disposed flatwise against the inner wall section.

In accordance with the invention, a plurality of spindles are journaled in drive unit 9 and support the lower run 5 of belt 3. More particularly, the drive unit includes a pair of idler spindles 15 and 16, a pair of tensioning spindles 17 and 18 and a pair of drive spindles 19 and 20. As best illustrated in FIG. 3, the lower run 5 of the belt passes around idler spindle 15 and then extends around the tensioning spindle 17 to the lower drive spindle 19. The path of the belt 3 then reverses and the belt extends around the second tensioning spindle 18 back around the upper drive spindle 20 and then around the idler spindle 16.

Drive unit 9 also includes a power source, such as an electric or hydraulic motor 22, which is operably connected to a gear reducing unit 23 having an output shaft 24. A pulley 25 is mounted on shaft 24 and a flexible driving member, such as a timing belt 26, connects pulley 25 with a pulley 27 mounted on shaft 28 of drive spindle 19. Belt 26 is also trained over a pulley 29 which is mounted on shaft 30 of drive spindle 20. Drive spindles 19 and 20 are journaled for rotation relative to side walls 11 by bearing assemblies 32, as seen in FIG. 2.

Timing belt 26 can be tensioned by a tensioning roller 33 which is mounted for rotation on shaft 34 and is engaged with the back side of the belt. The inner end of shaft 34 is threaded to a generally rectangular nut, which is mounted for sliding movement between a pair of guide bars 37 that are attached to side wall 11. Movement of the tensioning roller 33 relative to guide bars 37 will tension the timing belt 26 and the tensioning roller can be locked in the desired position by threading down shaft 34 in nut 36 which will draw the nut outwardly against the guide bars 37.

With the drive mechanism described above, the belt 26 acts to drive both of the spindles 19 and 20. This substantially increases the surface contact of the belt 3 with the driving members as opposed to a system utilizing a single drive spindle. Thus, the driving force and the capacity of the conveyor is substantially increased.

Drive unit 9 also includes a belt tensioning mechanism which will provide belt take up with a lesser stroke of movement of the actuating member. In this regard, each inner wall section 13 of side wall 11 is formed with a generally rectangular opening 38 and the outer wall sections 14 are correspondingly formed with openings 39 that are aligned with openings 38. The vertical dimension of each opening hole 39 is greater than that of the corresponding opening 38 so that the projecting edges of the inner wall sections 13 define shoulders 40, as best shown in FIG. 5. A plate 41 is mounted in the opening 39 of each outer wall section 14 and bears against the shoulders 40, as seen in FIG. 5.

The shafts 42 of the tensioning spindles 17 and 18 extend through holes in plates 43, as illustrated in FIG. 1 and the ends of the shafts 42 are received within openings in plates 41. Plates 43 are secured to the corresponding plates 41 by screws 43a, as shown in FIG. 1.

The outer end of each shaft 42 is non-circular, being provided with one or more flats 44 which mate with flat sides bordering the holes in plates 41. In this construction, shafts 42 are fixed to the plates 41 and 43 with the flats 44 preventing rotation of the shafts relative to the plates. Spindles 17 and 18 are journaled on shafts 42 by internal bearings, not shown, located within the spindles. Longitudinal movement of the tensioning spindles 17 and 18 being prevented by engagement of the outer plates 41 with the shoulders on the shafts 42 bordering the flats 44.

The composite plates 41 and 43, which carry the tensioning spindles 17 and 18, are mounted for sliding movement relative to the side walls 11. To provide this sliding movement, the upper and lower edges of each plate 41 are mounted for sliding movement within guide bars 46 which are secured in spaced relation to side walls 11 as shown in FIG. 5.

The composite slides 41,43 are adapted to be moved relative to the housing 10 of the drive unit in order to tension the belt by a fluid cylinder 47 which is mounted on one of the end walls 12. Piston rod 48 is mounted for sliding movement relative to cylinder 47 and the outer end of the piston rod is pivotally connected by pin 49 to the central portion of a yoke 50, as seen in FIG. 2, the yoke extends transversely of housing 10 between the side walls 11. Each end of yoke 50 carries a leg or extension 52 which extends outwardly through a hole 53 in the respective plate 41, as illustrated in FIGS. 4 and 5. In this construction, retraction of piston rod 48 will move the legs 52 into engagement with the edges bordering holes 53 to thereby move the side plates 41 and 43 and tensioning spindles 17 and 18 to the left as shown in FIG. 1 to tension the belt 3. With the reeving of the belt over the spindles 15–20, the amount of belt take up will be approximately twice the stroke of the piston rod 48, thus providing a more compact unit than conventional tensioning mechanisms.

Yoke 50 provides a self-tracking function which will aid in maintaining alignment of the belt on the spindles. As the belt tends to move to one side, yoke 50 will pivot about the axis of pin 49 causing a slight skewing of the slide plates 41,43 that carry the tensioning spindles 17 and 18, and the skewing will tend to move the belt in the opposite direction to provide a self-tracking feature.

The connection of the idler spindle 15 to the side walls 11 is illustrated in FIG. 6. Shaft 54 of spindle 15 extends through an opening in the inner wall section 13 and is received within an enlarged opening 55 in outer wall section 14. The outer end of the shaft 54 is non-circular, being formed with a pair of opposed parallel flats 56, each of which defines a shoulder or ledge with the inner portion of the shaft.

A generally C-shaped keeper plate 57 is positioned in the opening 55 and is provided with an open-ended slot 58 which receives the projecting end of shaft 54, as shown in FIG. 1. Slot 58 is bordered by a pair of straight parallel edges which mate with the flats 56, thus preventing rotation of the shaft relative to the side walls 11. The keeper plates 57 are attached to inner wall 13 via screws 60, which extend through enlarged holes in outer wall section 14.

The invention also includes a mechanism for skewing the idler spindle 16 for belt tracking purposes. This mechanism is illustrated in FIG. 6. A shaft 61 extends outwardly from each end of idler spindle 16 and extends through an enlarged hole 62 in inner wall section 13. The outer end of shaft 61 is received within an opening in plate 63. As previously described, the outer end of each shaft 61 is formed with one or more flats 64 and plate 63 has a straight edge which mates with the flat to prevent rotation of the shaft relative to plate 63. Spindle 16 is journaled on shafts 61 by bearings, not shown, located internally of the spindle.

A cam or eccentric 65 is mounted for rotation on the inner surface of each plate 63 and is located within an opening 66 in inner wall section 13. The shaft portion 67 of cam 65 extends outwardly through an opening in plate 63 while the outer end of the shaft carries a washer 68 and a snap ring 69 which locks the cam in position on plate 63. Located in the outer end of shaft 67 a non-circular hole, such as a hex-shaped hole, not shown, which is adapted to receive a tool in order to rotate cam 65.

As cam 65 is rotated, the peripheral cam surface will engage the edge of inner wall section 13 bordering opening 66. As inner wall section 13 is fixed, the rotation of the cam will cause the plate 63 to slide relative to inner wall section 13 As shaft 61 is connected to plate 63, movement of plate 63 will cause corresponding movement of shaft 61 and spindle 16. This skewing action will act to track the belt. The enlarged hole 62 permits the spindle shaft 61 and spindle 16 to move relative to inner wall section 13. After the belt is properly tracked, plate 63 can be locked to inner wall section 13 by lock screws 71 which extend through enlarged holes in plate 63 and are threaded into inner wall section 13 as shown in FIG. 6.

With the drive unit of the invention, using a pair of drive spindles 19, 20, the surface area of contact or wrap between the conveyor belt 3 and the drive members is substantially increased to thereby increase the power and capacity of the conveyor.

The belt tensioning system, which includes dual tensioning spindles, provides a compact unit in which the belt take-up is substantially increased for a given stroke of the actuating member or cylinder.

While the drawings illustrate the drive mechanism as being mounted beneath the conveyor frame 1 is contemplated that the drive unit can be mounted at various locations on the conveyor frame.

Various modes of carrying out the invention are contemplated as being within the scope of the following claims particularly pointing out and distinctly claiming the support matter which is regarded as the invention.

I claim:

1. A drive unit for a conveyor, comprising a frame, an endless conveying member supported for travel on the frame, a drive unit carried by the frame and including a supporting structure and a power source having an output shaft, a pair of drive spindles journaled on the supporting structure and disposed in operative engagement with said conveying member, a drive member connecting said drive shaft with said pair of drive spindles, tensioning means including a pair of tensioning spindles each mounted for movement relative to said support structure and engaged with said conveying member, and operating means operably connected to said tensioning spindles for moving said tensioning spindles to thereby tension said conveying member.

2. The drive unit of claim 1, wherein said conveying member is trained to pass over a first of said drive spindles and then over one of said tensioning spindles and then over the other of said drive spindles.

3. The drive mechanism of claim 1, wherein said pair of tensioning spindles are mounted to move in unison.

4. The conveyor construction of claim 3 and including a pair of slides mounted for movement on said supporting structure, said pair of tensioning spindles being journaled for rotation on said slides.

5. The conveyor construction of claim 4, wherein said operating means is operably connected to said slides.

6. The conveyor construction of claim 5, wherein said drive unit also includes tracking means for individually moving said slides to thereby track said conveying member.

7. The conveyor construction of claim 6, wherein said tracking means comprises a pivotable yoke, said operating means being connected to said yoke and the ends of said yoke being connected to said slides, said yoke being constructed and arranged such that skewing of the conveyor member will pivot said yoke to move one of said slides relative to said supporting structure to counteract said skewing.

8. The conveyor construction of claim 1, wherein the conveyor member is trained to pass over a first of said drive spindles and then over a first of said tensioning spindles then over a second of said drive spindles and then over a second of said tensioning spindles.

9. A conveyor construction, comprising a frame, an endless belt mounted for movement on the frame in a conveying run and a return run, a drive unit mounted on the frame for moving said belt in said runs, said drive unit including a supporting structure and a power source having an output shaft, said drive unit including a pair of idler spindles and a pair of drive spindles and a pair of tensioning spindles, said return run passing over a first of said idler spindles then over a first of said tensioning spindles and then over a first of said drive spindles and then over a second of said tensioning spindles and then over a second of said drive spindles and then over the second of said idler spindles, and connecting means operably connecting said output shaft with both of said drive spindles to thereby drive said drive spindles in synchronization.

10. The conveyor construction of claim 9, wherein the tensioning spindles are mounted to move in unison relative to said supporting structure, said construction also including belt tensioning means for moving said tensioning spindles in unison to tension the belt.

11. The construction of claim 10, wherein said belt tensioning means includes a pair of slides mounted for movement on the supporting structure, said first and second tensioning spindles being journaled on said slides, guide track means on said supporting structure for guiding said slides in movement, and actuating means operably connected to said slides for moving said slides and thereby moving said tensioning spindles in unison.

12. The construction of claim 9, wherein said supporting structure includes a pair of side walls, each side wall including a fixed inner wall member and an outer wall member mounted for movement relative to the corresponding inner wall member, one of said spindles having a shaft extending outwardly from the ends thereof, each end of said shaft extending through an enlarged opening in the respective inner wall member and being secured to the corresponding outer wall member, and belt tracking means operably connected to each outer wall member for moving the outer wall member relative to the inner wall member to thereby skew said one spindle relative to said side walls to track the belt.

13. The construction of claim 12, wherein said belt tracking means comprises a cam mounted for rotation on said outer wall member and disposed to engage an abutment on said inner wall member, whereby rotation of said cam will move said outer wall member relative to said inner wall member to track the belt.

14. The construction of claim 13, and including locking means for locking the outer wall member to the inner wall member.

15. A drive unit for a conveyor, comprising a conveyor frame, an endless conveying member supported for travel on the conveyor frame in an upper conveying run and a lower return run, a drive frame located beneath said conveyor frame, a pair of drive spindles journaled for rotation on the drive frame and engaged with the return run of the conveying member, a slide, means for mounting the slide for movement relative to said drive frame, a tensioning spindle journaled for rotation on said slide and engaged with the return of said conveying member, operating means mounted on the drive frame and connected to said slide for moving the slide to thereby tension said conveying member, and a power source mounted on the drive frame and having a drive shaft operably connected to said drive spindles to rotate said drive spindles and thereby drive said conveying member, said drive spindles being constructed and arranged to rotate in the same direction.

16. The drive unit of claim 15 wherein the axis of said tensioning spindle is disposed at a horizontal level intermediate the axes of said drive spindles.

17. The drive unit of claim 15 and including an endless drive member interconnecting said drive shaft and said drive spindles.

* * * * *